US012097760B2

(12) United States Patent
Tevis

(10) Patent No.: US 12,097,760 B2
(45) Date of Patent: Sep. 24, 2024

(54) METHODS AND SYSTEMS FOR DETECTING A MACHINE OPERATOR

(71) Applicant: Caterpillar Inc., Peoria, IL (US)

(72) Inventor: Ethan M. Tevis, Bloomington, IL (US)

(73) Assignee: Caterpillar Inc., Peoria, IL (US)

(*) Notice: Subject to any disclaimer, the term of this patent is extended or adjusted under 35 U.S.C. 154(b) by 374 days.

(21) Appl. No.: 17/387,914

(22) Filed: Jul. 28, 2021

(65) Prior Publication Data
US 2023/0035095 A1 Feb. 2, 2023

(51) Int. Cl.
B60K 28/06 (2006.01)
B60K 35/00 (2024.01)
B60K 35/26 (2024.01)
G06V 20/59 (2022.01)
B60K 35/28 (2024.01)

(52) U.S. Cl.
CPC .......... *B60K 28/066* (2013.01); *B60K 35/00* (2013.01); *G06V 20/593* (2022.01); *B60K 35/26* (2024.01); *B60K 35/28* (2024.01); *B60K 2360/162* (2024.01); *B60K 2360/178* (2024.01); *B60W 2510/104* (2013.01)

(58) Field of Classification Search
CPC ........ B60K 2370/157; B60K 2370/162; B60K 2370/178; B60K 28/06; B60K 28/066; B60K 35/00; B60W 2510/104; G06K 9/00; G06K 9/00838; G06V 20/59; G06V 20/593
See application file for complete search history.

(56) References Cited

U.S. PATENT DOCUMENTS

| 6,909,947 | B2 | 6/2005 | Douros et al. | |
|---|---|---|---|---|
| 7,551,093 | B2 | 6/2009 | Maass | |
| 8,459,396 | B2 | 6/2013 | Oettinger | |
| 9,129,460 | B2 | 9/2015 | McClellan et al. | |
| 9,499,095 | B1* | 11/2016 | Buehler | B60Q 1/26 |
| 2004/0201286 | A1* | 10/2004 | Harvey | A01D 34/828 |
| | | | | 307/326 |
| 2009/0290757 | A1* | 11/2009 | Mian | G06V 20/653 |
| | | | | 382/104 |
| 2010/0057308 | A1* | 3/2010 | Hill | B60R 21/0132 |
| | | | | 701/1 |
| 2014/0104053 | A1* | 4/2014 | Clark, Jr. | B60R 16/02 |
| | | | | 340/457.1 |

(Continued)

FOREIGN PATENT DOCUMENTS

| DE | 102005012262 A1 | 9/2006 |
|---|---|---|
| DE | 102008033722 A1 | 1/2010 |

*Primary Examiner* — Logan M Kraft
*Assistant Examiner* — Johnny H Hoang
(74) *Attorney, Agent, or Firm* — Perkins Coie LLP

(57) ABSTRACT

A technique is directed to methods and systems for detecting the presence of a machine operator. In some implementations, an operator presence system monitors a machine to determine whether an operator is present in an operating machine. The operator presence system collects input data from sensors or devices on the machine and determines whether the operator is in the operator seat. During operation, if an operator is determined to not be in the operator seat, the operator presence system can generate and send notifications (e.g., visual or audible warnings) to alert the operator to sit in the operator seat.

20 Claims, 8 Drawing Sheets

(56) References Cited

U.S. PATENT DOCUMENTS

| | | | |
|---|---|---|---|
| 2016/0042624 A1* | 2/2016 | Quave | B60H 1/00778 |
| | | | 340/457 |
| 2017/0129399 A1* | 5/2017 | Appukutty | B60N 2/289 |
| 2017/0210289 A1* | 7/2017 | Dhawan | A61B 3/113 |
| 2020/0180585 A1* | 6/2020 | Barade | B60T 13/686 |
| 2020/0237277 A1* | 7/2020 | Ouyang | B60K 28/06 |
| 2021/0206343 A1* | 7/2021 | Welk | G08B 7/06 |
| 2021/0291725 A1* | 9/2021 | Makhdoom | B60Q 1/509 |

* cited by examiner

METHODS AND SYSTEMS FOR DETECTING A MACHINE OPERATOR

BACKGROUND

Users operate machinery such as earthmoving or construction equipment in worksite environments. However, during operation, an operator can leave the operator seat which can potentially result in damage to the machine, operator, or bystanders. Safety for personnel and protecting equipment is a growing concern in the industry, and companies have implemented prevention techniques to protect personnel and equipment from dangerous events. For example, U.S. Pat. No. 9,129,460B2 describes a method for monitoring a machine to determine if the driver is operating the machine in an unsafe or aggressive manner. However, this method is only directed to monitoring operating parameters such as vehicle speed, seat belt status, or turn signal use. Additionally, U.S. Pat. No. 8,459,396B2 describes a method for determining whether an operator is seated on a driver's seat. However, this method is only directed to monitoring the movement of an operator in a driver's seat and alerting the operator if they exceed a tolerance distance threshold from the seat.

SUMMARY

In some embodiments, a method for detecting the presence of a machine operator includes receiving, from a machine, at least one signal indicating the machine is operating, wherein the signal includes a seat switch status. The method can include determining an operator is present in the machine based on the signal and set an operator status to indicate that the operator is present in the machine. The method can include determining, based upon the seat switch status, the operator is not in an operator seat while the machine is operating. In response to the determining that the operator is not in the operator seat, the method can include generating at least one of an audible notification and a visual notification. The method can further include determining a transmission output speed of the machine is equal to zero for a time threshold and in response to the determining the transmission output speed is equal to zero for the time threshold, setting the operator status to not present.

In some embodiments, a system for detecting the presence of a machine operator includes receiving, from a machine, at least one signal indicating the machine is operating, wherein the signal includes a seat switch status. The system can include determining an operator is present in the machine based on the signal and set an operator status to indicate that the operator is present in the machine. The system can include determining, based upon the seat switch status, the operator is not in an operator seat while the machine is operating. In response to the determining that the operator is not in the operator seat, the system can include generating at least one of an audible notification and a visual notification. The system can further include determining a transmission output speed of the machine is equal to zero for a time threshold and in response to the determining the transmission output speed is equal to zero for the time threshold, setting the operator status to not present.

In some embodiments, the machine can further include one or more processors, and one or more memory devices having stored thereon instructions that when executed by the one or more processors cause the one or more processors to perform at least one of the following: (i) receive, from a machine, at least one signal indicating the machine is operating, wherein the signal includes a seat switch status; (ii) determine an operator is present in the machine based on the signal; (iii) set an operator status to indicate that the operator is present in the machine; (iv) determine, based upon the seat switch status, the operator is not in an operator seat while the machine is operating; and (v) in response to the determining that the operator is not in the operator seat, generate at least one of an audible notification and a visual notification.

Other aspects will appear hereinafter. The features described herein can be used separately or together, or in various combinations of one or more of them.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for detecting the presence of a machine operator. In some implementations, an existing operator presence system (OPS) monitors a machine to determine whether an operator is present in an operating machine. When the OPS determines the operator is not present, the operator presence system can disable functions such as implements (e.g., blades, buckets, rippers, etc.), or engage items, such as a parking brake or machine shutoff switch, to prevent damage to the operator, bystanders, or the machine. However, such an OPS typically has many inputs which must all be met in order to determine the operator is not present. This is because of the complexity of machine operations and other potential hazards which might arise due to erroneously determining an operator is not present when they actually are present during operation. In contrast to known OPS systems, here, only some of the inputs to the OPS logic are employed to send a warning to operators that a particular action is not desired, without causing a separate hazard that could be caused by mistakenly determining that the operator is not present. This can be done using onboard sensors and detection devices to provide visual and/or audible warnings to the operator.

In an embodiment, the OPS collects input data (signals) from sensors or devices on the machine. The sensors and devices can include pedal (e.g., brake or throttle) position sensors, machine operating condition sensors, operator-controlled input devices, gear status sensors, throttle position sensors, transmission output speed sensors, transmission inching pedal position sensors, or operator cab sensors. The OPS can determine whether the operator is present in the cab of the machine, whether the operator is in the operator seat, whether machine controls or pedals are being used, or whether there are bystanders in the proximity of the machine. During operation, if it is determined that the operator is not in the operator seat (e.g., standing, stretching, improving visibility, etc.) the OPS can generate and send notifications (e.g., visual or audible warnings, safety warning, flashing lights, vibration in the floor of the cab, vibration in the controls or steering instrument, or an alarm) to alert the operator to sit in the operator seat. The notification can indicate that the operator is not seated while the machine is moving, while the machine is in gear, or while a service brake pedal or throttle pedal is engaged. The notification can continue for a time threshold or until the operator sits in the operator seat. In some implementations, the OPS can transmit the notification both inside and outside of the cab of the machine to alert bystanders of the potential danger. The OPS can detect if the operator is not seated and generate the safety warning without inducing a hazard related to a false determination that the operator is not present in the machine.

Figure 1:
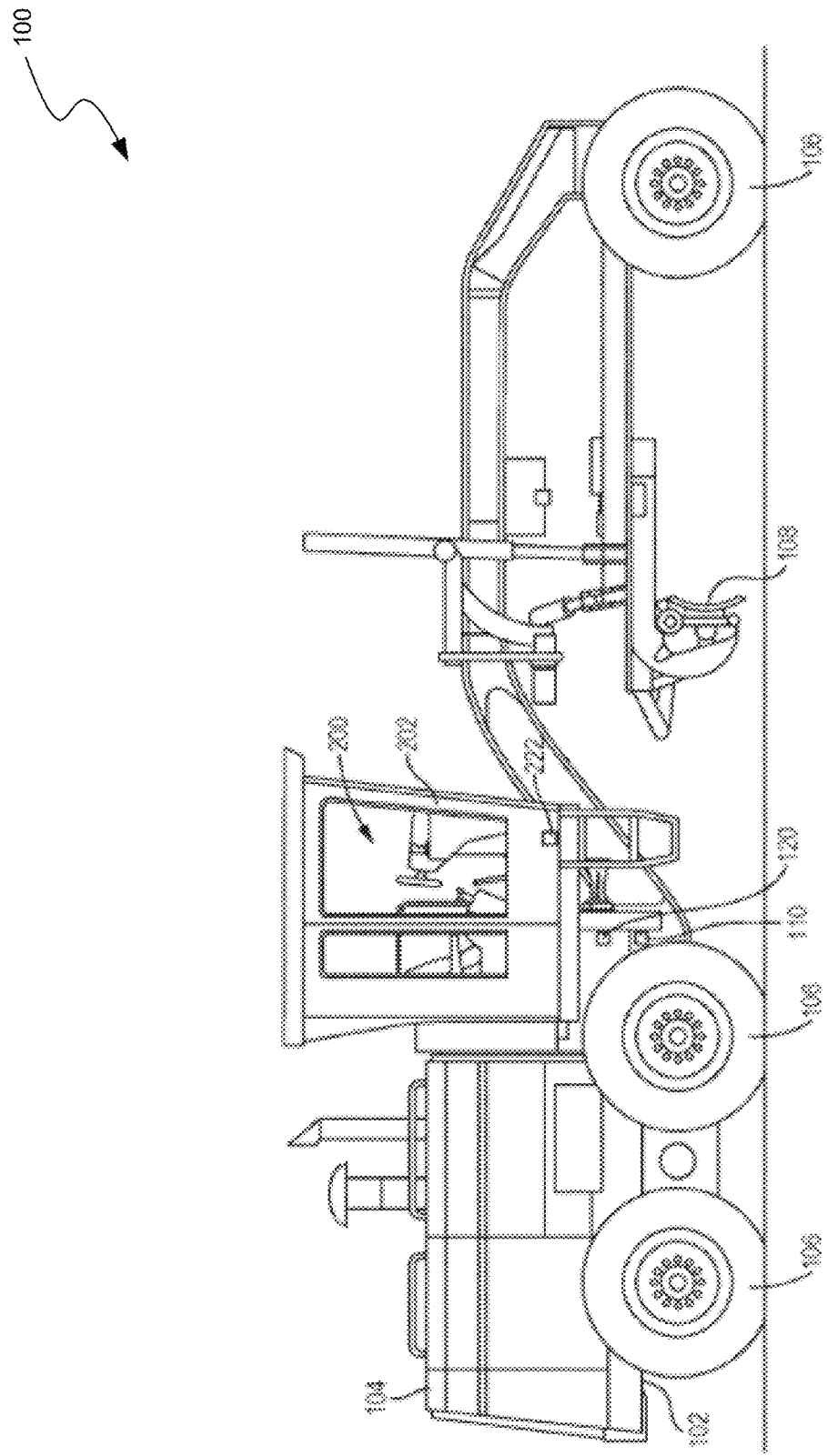
FIG. 1 is a side-view of one embodiment of a work machine including an operator presence system according to the present disclosure.

Several implementations are discussed below in more detail in reference to the figures. FIG. 1 is a side-view of one embodiment of a work machine 100 including an operator presence system. The work machine 100 may be any one of a number of different earth moving, construction, mining, agricultural or industrial type machines such as a motor grader, a large mining truck, a bulldozer, an excavator, a tractor, or the like. Using the motor grader shown in FIG. 1, only as an example, the work machine 100 incudes a frame 102, an engine 104 mounted to the frame 102, an operator cab 200 (see FIG. 2 for detailed view) supported by the frame 102, and at least one ground engaging device 106 that supports the frame 102 and is powered by the engine 104. The ground engaging device 106 may be wheels, tracks, treads, or the like which serve to enable the machine 100 to engage the ground and move. The machine 100 may additionally have various implements 108 attached to allow the machine 100 to perform various jobs. The illustrated machine 100 is equipped with a blade 108; however, this implement is typically found on a motor grader and many other implements on many other work machines are possible. Other work machines may also include more than one implement.

The machine 100 may also be equipped with a brake system 110. The brake system may include a service brake and a parking brake. Additionally, the machine 100 may include a transmission system including a neutral gear and one or more forward and reverse speeds. Further, the machine 100 may have a default all-wheel drive (AWD) system, with an option of enabling a creep mode in which only the front wheels are driven. The work machine 100 may also include a plurality of machine operating condition sensors 120 configured to sense various operating conditions including, but not limited to, the actual machine speed, the actual engine speed (usually measured by transmission output speed), the actual gear of the transmission system, and which AWD mode is enabled.

Figure 2:
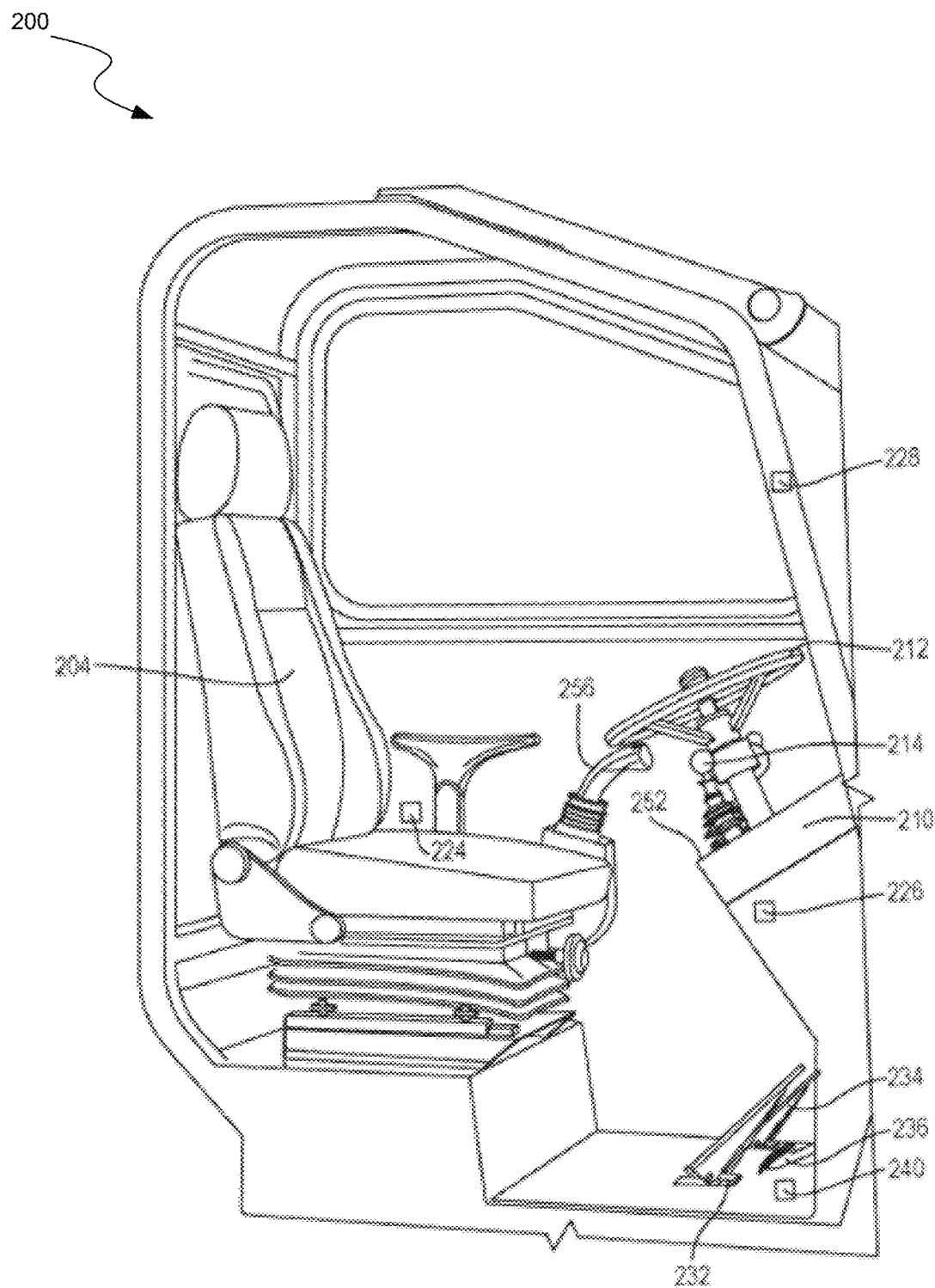
FIG. 2 is a close up of the operator cab of FIG. 1, according to the present disclosure.

The work machine 100 is controlled by an operator (not shown) from the operator cab 200, shown in more detail in FIG. 2. The operator cab 200 may have a cab door 202. A seat 204 for the operator is located in the operator cab 200 and equipped with a seat belt. A steering column 210 may include a steering wheel 212 and implement control levers 214. The steering column 210 may be adjustable from a neutral position to be more accessible for the operator. The work machine 100 also includes a plurality of operator status sensors. The cab door 202 (not shown) may have a sensor 222 configured to determine if the door is open or closed. The seat belt may have a sensor 224 configured to determine if the seat belt is engaged. A sensor 226 may determine the position of the steering column 210. The operator cab 200 may also include sensors 228 configured to directly detect the presence of an operator. These operator detection sensors may use various technologies known in the art, including but not limited to thermal detection, face detection, eye detection, or body detection. Each of these operator status sensors may be configured to provide a signal to the control module.

Figure 5:
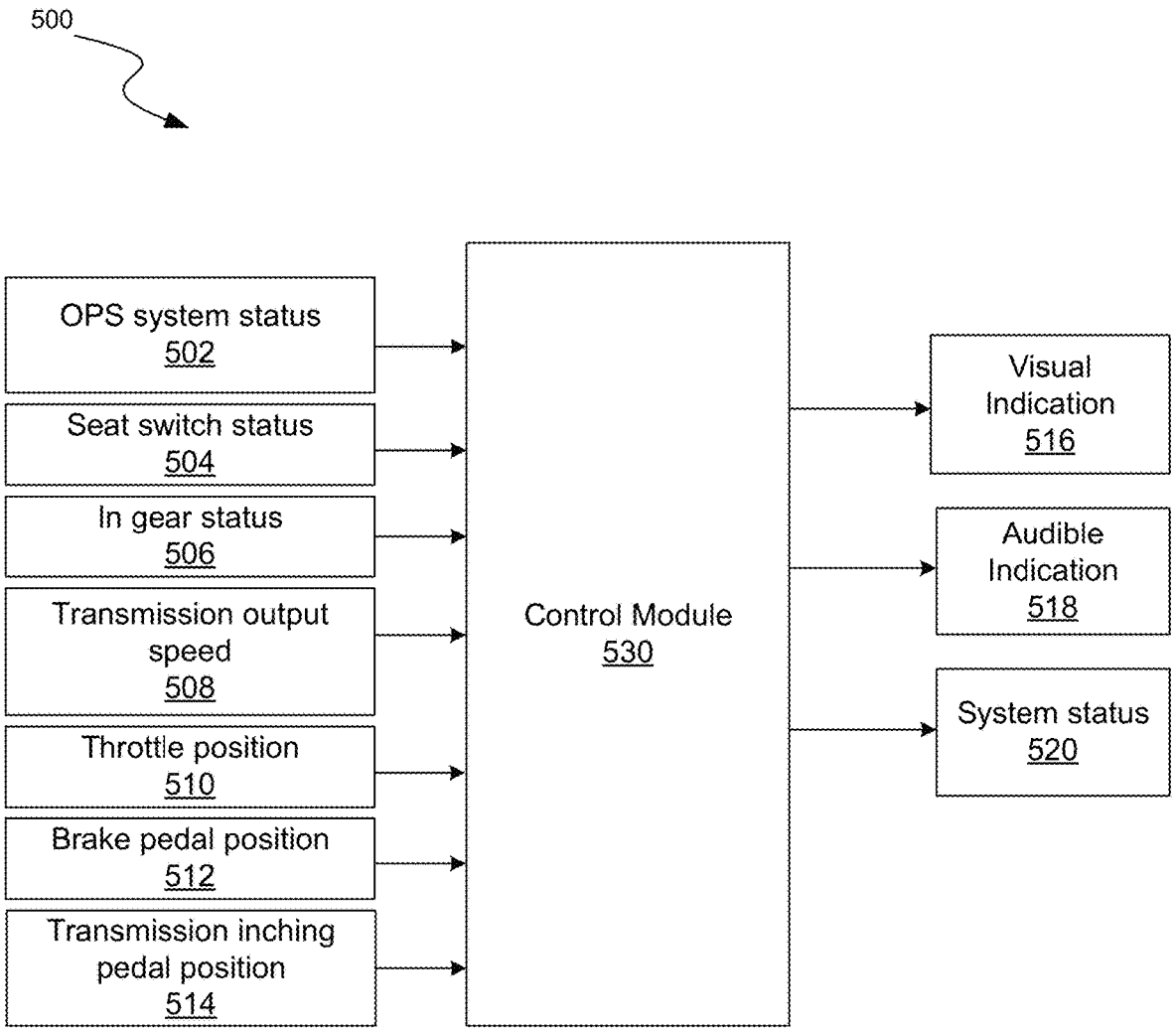
FIG. 5 is a schematic diagram illustrating an example of an operator presence system.

The operator cab 200 also includes various levers and pedals which allow the operator to control the machine 100 and its implements 108. A throttle pedal 232 is used to control engine speed. An inching pedal 234 disengages power to the wheels 106 and allows for fine movement control. A service brake pedal 236 applies the service brakes. Pedal position sensors 240 for each of the throttle pedal, inching pedal, and service brake pedal 246 may be configured to sense the position of each pedal and provide a signal to the control module 530 (FIG. 5). Other operator input devices may be located on a control panel, or elsewhere in the operator cab 200. These may include calibration tools for any machine or implement controls, park request devices 256 such as a parking brake switch or lever, and any operator selectable switches. Each of these operator input devices may be configured to provide a signal to the control module. Additional details for an exemplary operator presence system are described in U.S. application Ser. No. 16/984,871.

Figure 3:
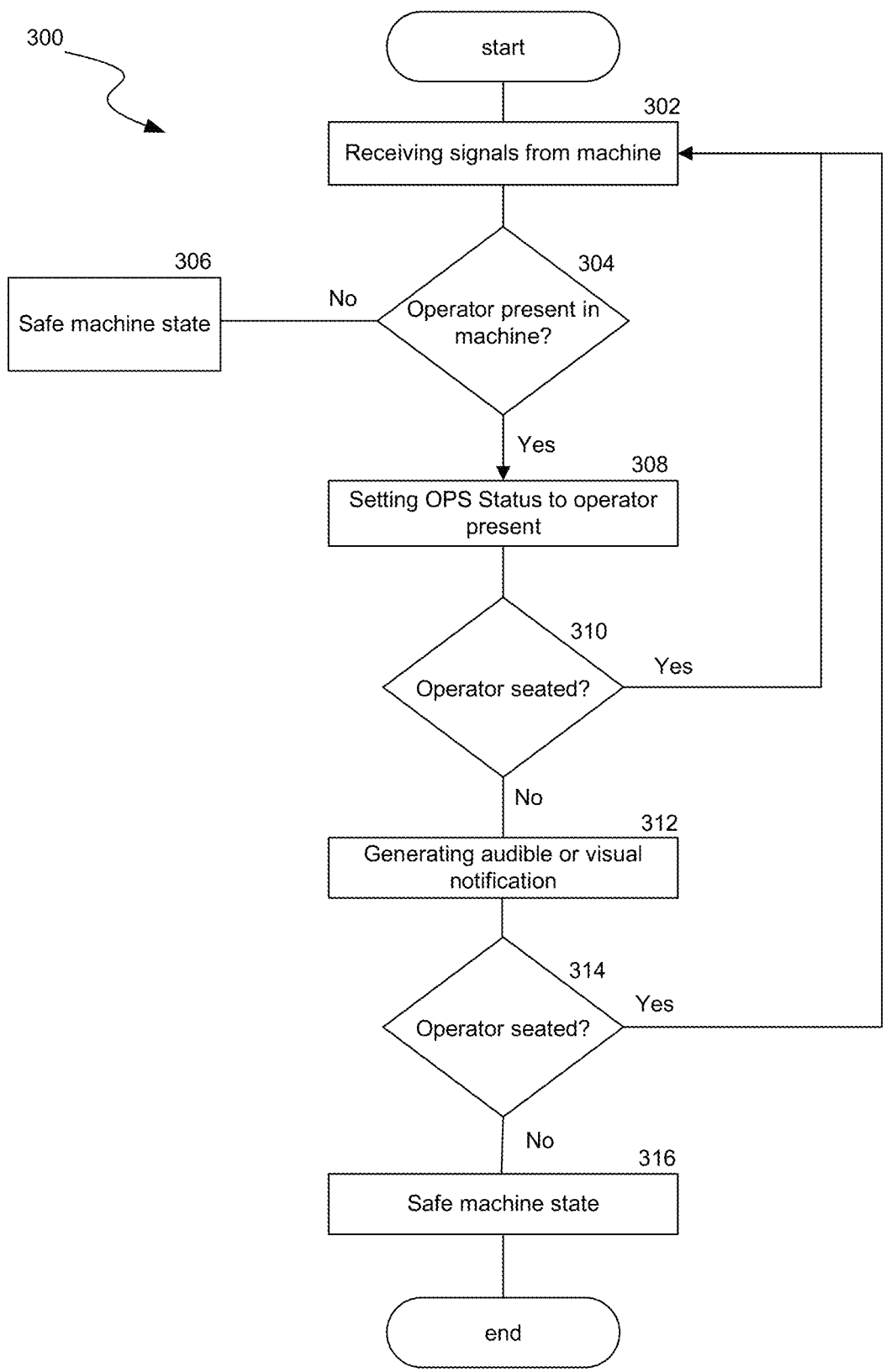
FIG. 3 is a flow diagram illustrating a process used in some implementations for determining an operator presence.

FIG. 3 is a flow diagram illustrating a process 300 used in some implementations for determining an operator presence. In an embodiment, process 300 is triggered by any of the machine powering on, a user (e.g., operator) pressing a button on a control device, inputting a command, activating operator detection sensors, or, alternatively, process 300 can always be operating while the machine is powered on. Examples of suitable machines are, but not limited to, construction equipment, mining equipment, bulldozers, excavators, trenchers, loaders, backhoes, compactors, graders, feller bunchers, graders, wheel tractor scrapers, skid-steer loaders, dump trucks, cranes, telehandlers, pavers, and/or pile-driving/boring machines.

At step 302, process 300 receives signals from devices and sensors on a machine. The sensors and devices (e.g., radar, lidar, cameras, etc.) can detect a presence of an operator based on the status of the pedals or controls, activation of seat sensors, door sensors, seat belt sensors, temperature sensors, gear status, throttle position, transmission output speed (TOS), transmission inching pedal (modulation) position, detected motion on the machine or in the cab of the machine, machine pitch, machine yaw, machine roll, machine acceleration in any direction, or steering wheel/control movement.

At step 304, process 300 determines whether the operator is present in the machine. Process 300 can determine the operator is present based on signals (data) collected from the sensors and devices in the machine. For example, the operator is determined to be present if the operator switch in the seat detects the operator, the actual gear of the machine is not neutral, the transmission output speed is greater than zero, or the transmission modulator control (inching pedal) is depressed.

When process 300 determines an operator is not present, at step 306, process 300 puts the machine into a safe state to prevent damage to the machine or harm to personnel. For example, if the determination indicates that the operator is not present, the steering and implement functions are locked out, gear shifts out of neutral are not allowed, and/or transitions of the parking brake from engaged to disengaged are not allowed. When process 300 determines an operator is present, at step 308, process 300 sets the OPS status to operator present to indicate to the operator is present.

At step 310, process 300 determines whether the operator is seated while operating the machine. Process 300 can determine the operator is seated based on sensor data. The sensor data can detect if any weight is on the seat, whether the seat belt is engaged, temperature of the seat, or whether a seat switch is activated. When process 300 determines the operator is not seated while the machine is moving or in gear or while the service brake or throttle pedal is engaged, at step 312, process 300 generates an audible and/or visual notification to alert the operator. The notification can warn/alert the operator of the potential hazard/danger of operating a machine while not seated. When process 300 determines the operator is seated while machine is moving or in gear or while the service brake or throttle pedal is engaged, process 300 can continue to collect signals from the devices and sensors on the machine at step 302.

At step 314, process 300 performs a check to determine whether the operator is seated while operating the machine after receiving the notification. If the operator continues to operate the machine in the unsafe manner (e.g., standing while operating the machine) beyond a predetermined time threshold, at step 316, process 300 puts the machine into a safe state to prevent damage to the machine or harm to personnel. When process 300 determines at step 314 that the operator is seated after the notification, process 300 can continue to collect signals from the devices and sensors on the machine at step 302.

Process 300 can detect a change of operational status, such as detecting the risk when an operator is exiting or entering a machine. Operators may stand up during operator for various reasons (e.g., stretching, improving visibility, falling out of the cab, etc.), and process 300 can warn the operator of the unsafe state to operate the machine.

Process 300 can detect any suitable action of the operator suggesting inattention and generate a notification (e.g., safety warning) based on the action. For example, process 300 detects the operator is drinking, eating, operating with one hand, the operator's gaze is distracted (e.g., looking away from the direction the machine is moving), or any other comparable action. Process 300 can generate the notification to alert of the operator of the unsafe action without powering down the machine or engaging a brake of the machine.

Figure 4:
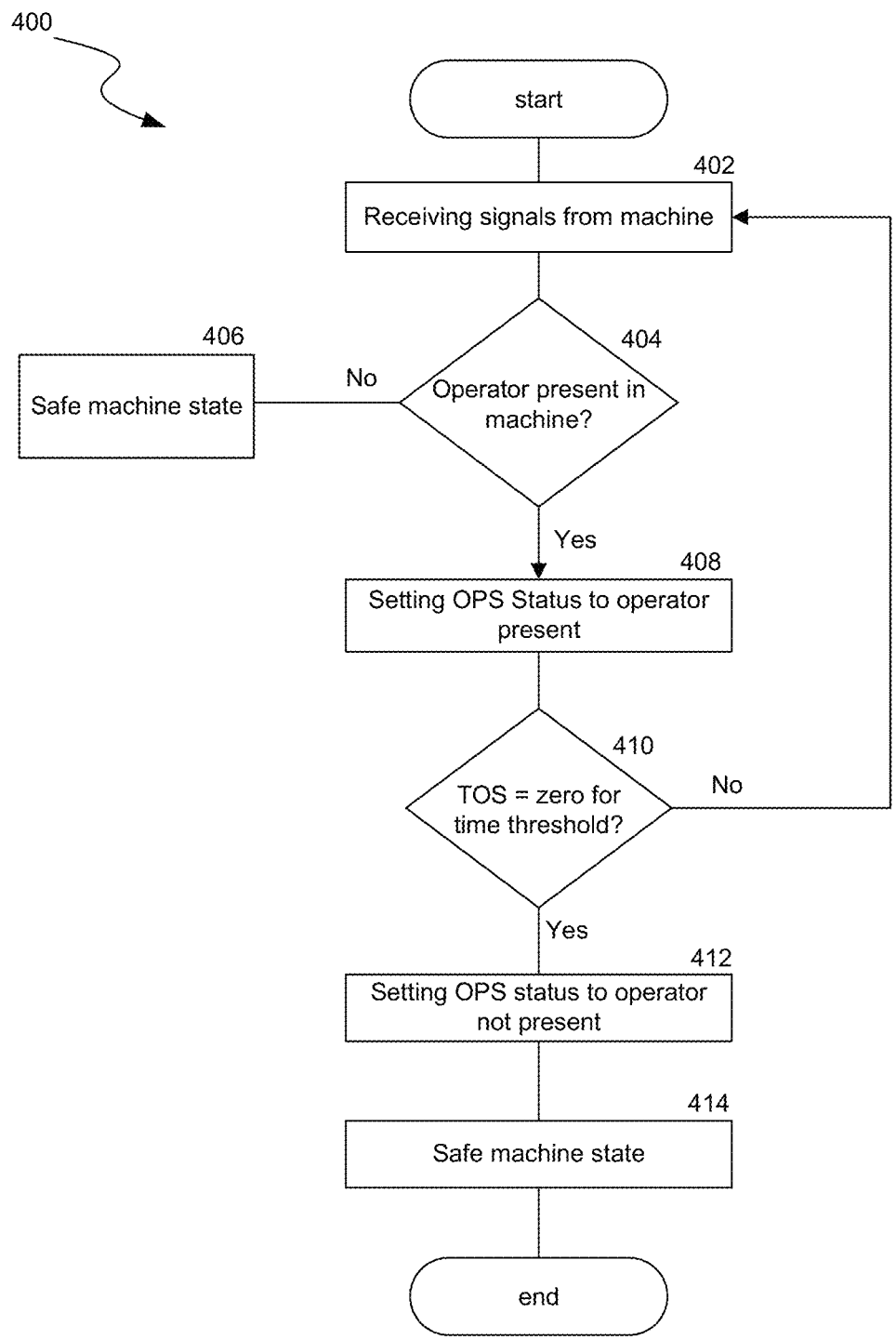
FIG. 4 is a flow diagram illustrating a process used in some implementations for setting an operator presence status.

FIG. 4 is a flow diagram illustrating a process 400 used in some implementations for determining an operator presence. In a preferred embodiment, process 400 is triggered by the machine powering on, a user (e.g., operator) pressing a button on a control device or inputting a command, activating operator detection sensors, or process 400 can always be operating while the machine is powered on. Examples of machines are, but not limited to, the types of machines described above in the discussion of FIG. 3.

At step 402, process 400 receives signals from devices and sensors on a machine. The sensors and devices (e.g., radar, lidar, cameras, etc.) can detect a presence of an operator based on the status of the pedals or controls, activation of seat sensors, door sensors, seat belt sensors, temperature sensors, gear status, throttle position, transmission output speed (TOS), detected motion on the machine or in the cab of the machine, machine pitch, machine yaw, machine roll, machine acceleration in any direction, or steering wheel/control movement.

At step 404, process 400 determines whether the operator is present in the machine. Process 400 can determine the operator is present based on signals (data) collected from the sensors and devices in the machine. For example, if controls or pedals are being moved, the machine is moving, or a seat sensor is activated, process 400 determines the operator is present in the machine. When process 400 determines an operator is not present, at step 406, process 400 puts the machine into a safe state to prevent damage to the machine or harm to personnel. When process 400 determines an operator is present, at step 408, process 400 sets the OPS status to operator present to indicate to the operator is present.

At step 410, process 400 determines whether the TOS is equal to zero for at least a time threshold (e.g., any threshold of time, 10 seconds, 30 seconds, 100 seconds, etc.). When process 400 determines that the TOS has not been zero for at least the time threshold, process 400 can continue collecting signals from the devices and sensors on the machine at step 402. When the TOS is equal to zero for at least the time threshold, at step 412, process 400 sets the OPS status to operator not present. Process 400 can generate a notification to alert personnel at the worksite that the operator is not present in the machine (not shown). At step 414, process 400 puts the machine into a safe state to prevent damage to the machine or harm to personnel when an operator is determined to not be present.

FIG. 5 is a schematic diagram illustrating example 500 of an operator presence system. The control module 530 can receive data inputs from sensors or devices on the machine, the inputs can include the OPS system status 502, seat switch status 504, in gear status 506, transmission output speed 508, throttle position 510, brake pedal position 512, and transmission inching pedal position 514. Control module 530 can process the data inputs and generate outputs. The outputs can include a visual indication 516 (e.g., lights, blinking dashboard, etc.), an audible indication 518 (e.g., an alarm, siren, bell, horn, etc.), and a system status 520 (e.g., operator present status or not present status).

The control module 530 can collect input data by receiving signals from sensors or devices on the machine. The sensors or devices (e.g., radar, lidar, cameras, etc.) can detect an operator action (e.g., operating the machine while standing, operating the machine while seated, eating or drinking while operating the machine, or the operator is distracted by a device, such as using a smart phone, adjusting headphones, etc.) based on the status of the pedals or controls, activation of seat sensors, door sensors, seat belt sensors, temperature sensors, gear status, transmission inching pedal position, throttle position, transmission output speed (TOS), detected motion on the machine or in the cab of the machine, machine pitch, machine yaw, machine roll, machine acceleration in any direction, steering wheel/control movement, operator gaze detection, etc. If an operator is detected, the control module 530 can determine if the operator is operating the machine safely, such as remaining seated in the operator seat during operation, looking at mirrors and around the machine, or standing while operating the machine. If an unsafe action (e.g., operating while standing for too long or under tilting conditions) of the operator is detected, control module 530 can generate a notification (e.g., audible indication 518 or visual indication 516) to alert the operator and personnel at the worksite of the unsafe action. The control module 530 can use machine logic to determine if an operator is present and generate an alarm. A first example of machine logic is: if operator presence system (OPS) status=operator present AND seat switch status=operator NOT PRESENT THEN audible warning and/or visual indication. A second example of machine logic is: if OPS status=operator PRESENT AND TOS equals 0 for greater than 30-600 seconds THEN override OPS system status to NOT PRESENT.

Figure 6:
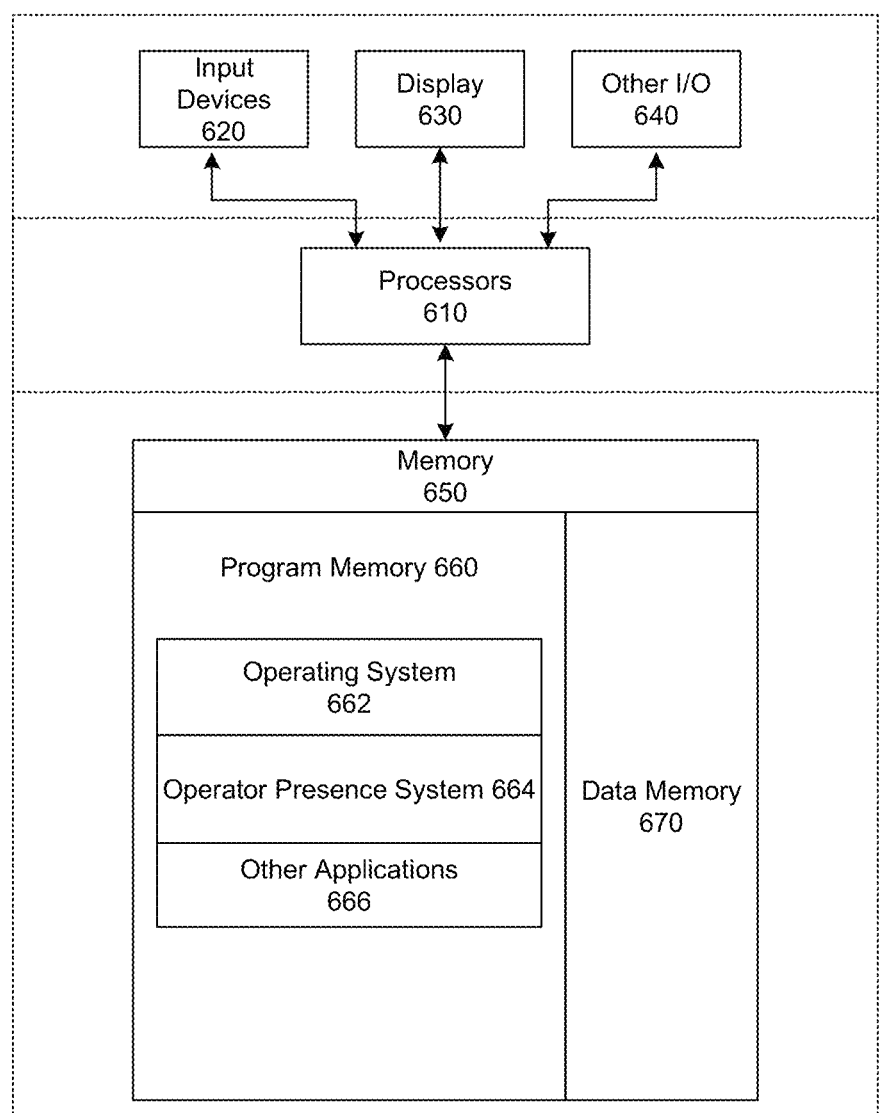
FIG. 6 is a block diagram illustrating an overview of devices on which some implementations can operate.

FIG. 6 is a block diagram illustrating an overview of devices on which some implementations of the disclosed technology can operate. The devices can comprise hardware components of a device 600 that manage entitlements within a real-time telemetry system. Device 600 can include one or more input devices 620 that provide input to the processor(s) 610 (e.g. CPU(s), GPU(s), HPU(s), etc.), notifying it of actions. The actions can be mediated by a hardware controller that interprets the signals received from the input device and communicates the information to the processors 610 using a communication protocol. Input devices 620 include, for example, a mouse, a keyboard, a touchscreen, an infrared sensor, a touchpad, a wearable input device, a camera- or image-based input device, a microphone, or other user input devices.

Processors 610 can be a single processing unit or multiple processing units in a device or distributed across multiple devices. Processors 610 can be coupled to other hardware devices, for example, with the use of a bus, such as a PCI bus or SCSI bus. The processors 610 can communicate with a hardware controller for devices, such as for a display 630. Display 630 can be used to display text and graphics. In some implementations, display 630 provides graphical and textual visual feedback to a user. In some implementations, display 630 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 640 can also be coupled to the processor, such as a network card, video card, audio card, USB, FireWire or other external device, camera, printer, speakers, CD-ROM drive, DVD drive, disk drive, or Blu-Ray device.

In some implementations, the device 600 also includes a communication device capable of communicating wirelessly or wire-based with a network node. The communication device can communicate with another device or a server through a network using, for example, CAN, LIN, FlexRay, Ethernet and/or TCP/IP protocols. Device 600 can utilize the communication device to distribute operations across multiple network devices.

The processors 610 can have access to a memory 650 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 650 can include program memory 660 that stores programs and software, such as an operating system 662, operator presence system 664, and other application programs 666. Memory 650 can also include data memory 670, storing throttle data, user data, machine data, transmission data, sensor data, device data retrieval data, management data, notification data, configuration data, settings, user options or preferences, etc., which can be provided to the program memory 660 or any element of the device 600.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 7:
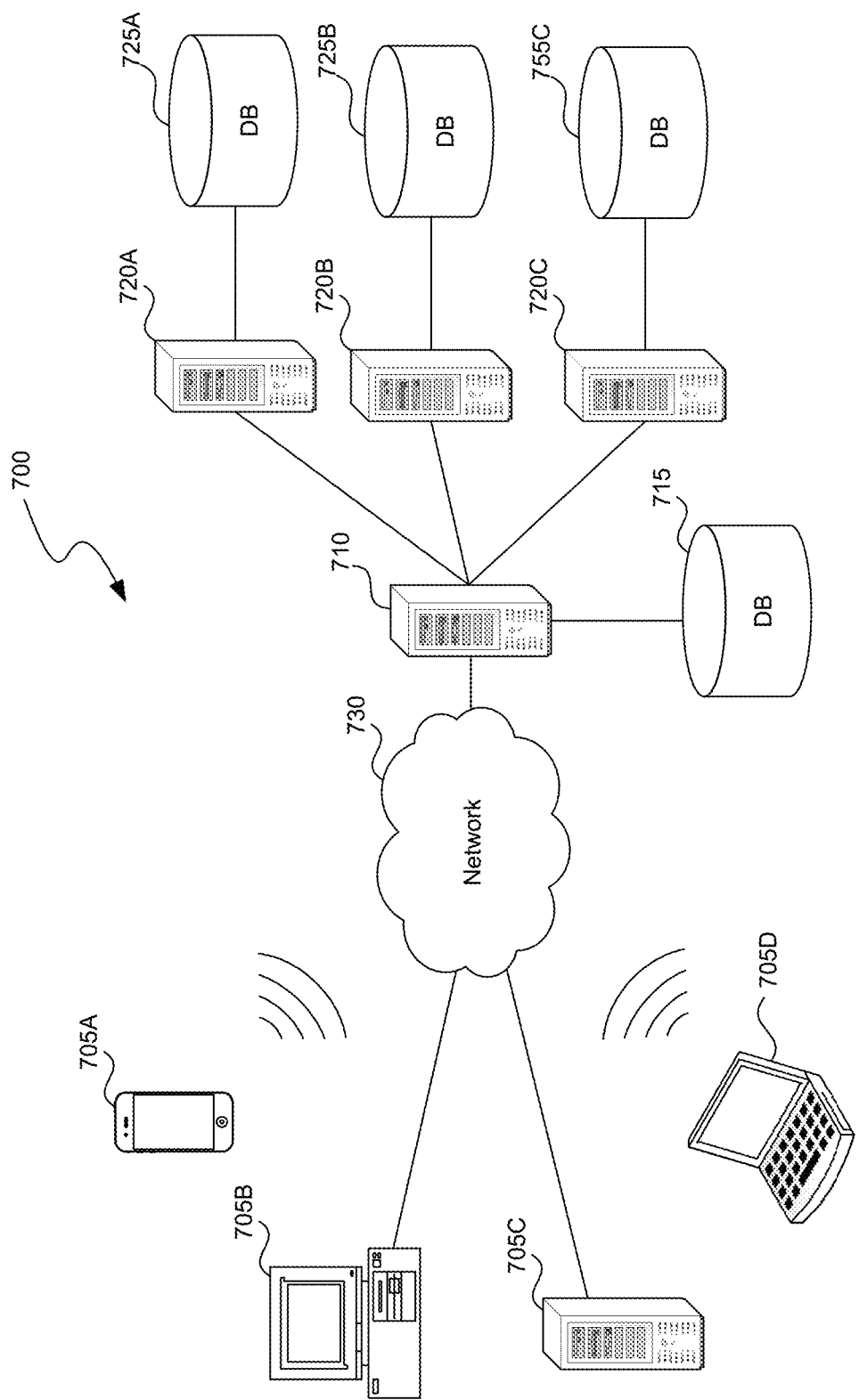
FIG. 7 is a block diagram illustrating an overview of an environment in which some implementations can operate.

FIG. 7 is a block diagram illustrating an overview of an environment 700 in which some implementations of the disclosed technology can operate. Environment 700 can include one or more client computing devices 705A-D, examples of which can include device 600. Client computing devices 705 can operate in a networked environment using logical connections through network 730 to one or more remote computers, such as a server computing device 710.

In some implementations, server 710 can be an edge server which receives client requests and coordinates fulfillment of those requests through other servers, such as servers 720A-C. Server computing devices 710 and 720 can comprise computing systems, such as device 600. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server/client devices. Server 710 can connect to a database 715. Servers 720A-C can each connect to a corresponding database 725A-C. As discussed above, each server 720 can correspond to a group of servers, and each of these servers can share a database or can have their own database. Databases 715 and 725 can warehouse (e.g. store) information such as implement data, machine data, sensor data, device data, notification data, measurement, and alert data. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. Network 730 may be the Internet or some other public or private network. Client computing devices 705 can be connected to network 730 through a network interface, such as by wired or wireless communication. While the connections between server 710 and servers 720 are shown as separate connections, these connections can be any kind of local, wide area, wired, or wireless network, including network 730 or a separate public or private network.

Figure 8:
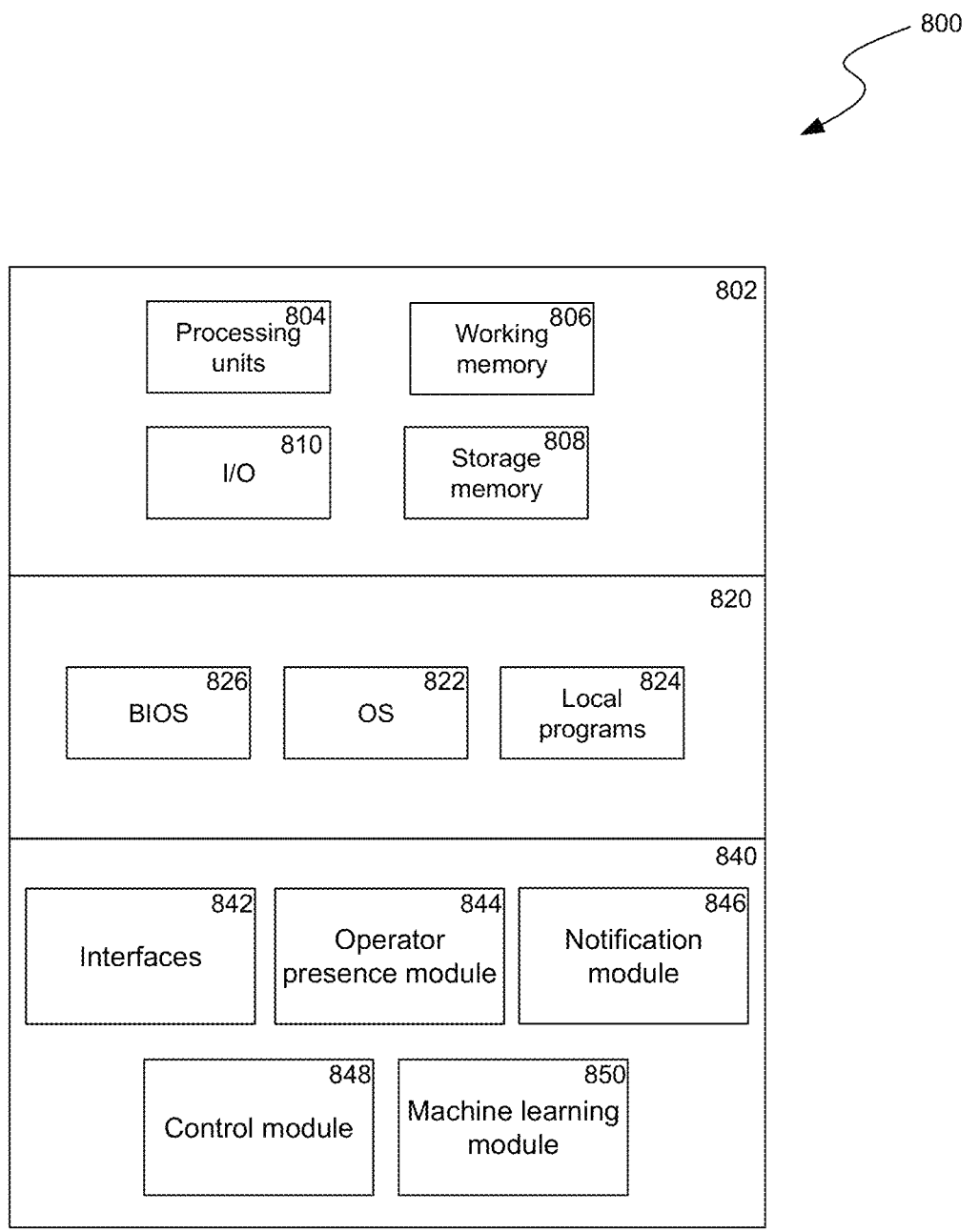
FIG. 8 is a block diagram illustrating components which in some implementations can be used in a system employing the disclosed technology.

FIG. 8 is a block diagram illustrating components 800 which, in some implementations, can be used in a system employing the disclosed technology. The components 800 include hardware 802, general software 820, and specialized components 840. As discussed above, a system implementing the disclosed technology can use various hardware including processing units 804 (e.g. CPUs, GPUs, APUs, etc.), working memory 806, storage memory 808 (local storage or as an interface to remote storage, such as storage 715 or 725), and input and output devices 810. In various implementations, storage memory 808 can be one or more of: local devices, interfaces to remote storage devices, or combinations thereof. For example, storage memory 808 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 715 or storage provided through another server 720). Components 800 can be implemented in a client computing device such as client computing devices 705 or on a server computing device, such as server computing device 710 or 720.

General software 820 can include various applications including an operating system 822, local programs 824, and a basic input output system (BIOS) 826. Specialized components 840 can be subcomponents of a general software application 820, such as local programs 824. Specialized components 840 can include operator presence module 844, notification module 846, control module 848, machine learning module 850, and components which can be used for providing user interfaces, transferring data, and controlling the specialized components, such as interfaces 842. In some implementations, components 800 can be in a computing system that is distributed across multiple computing devices or can be an interface to a server-based application executing one or more of specialized components 840. Although depicted as separate components, specialized components 840 may be logical or other nonphysical differentiations of functions and/or may be submodules or code-blocks of one or more applications.

In some embodiments, the operator presence module 844 is configured to determine whether the operator is present in the machine during operation. The operator presence module 844 can collect input data by receiving signals from sensors or devices on the machine. The sensors or devices (e.g., radar, lidar, cameras, etc.) can detect an operator based on the status of the pedals or controls, activation of seat sensors, door sensors, seat belt sensors, temperature sensors, gear status, throttle position, transmission output speed (TOS) detected motion on the machine or in the cab of the machine, machine pitch, machine yaw, machine roll, machine acceleration in any direction, controls/steering-wheel movement, etc. If an operator is detected, the operator presence module 844 can determine if the operator is seated in the operator seat during operation. In some cases, when an operator is not detected, the operator presence module 844 can engage the brake of the machine or power-down the machine until an operator is detected.

In some embodiments, the notification module 846 is configured to generate and send a notification (e.g., visual and/or audible warning) to the operator when the operator is not in the operator seat during operation. The notification module 846 can send a notification to the operator to alert the operator to sit in the operator seat during operation. The notification can continue until the operator is seated in the operator seat. For example, a light or an alarm in the cab of the machine remains on for a duration or until the operator is detected in the seat of the machine. In some implementations, the notification module 846 projects the notification inside and outside the machine to alert personnel of potential danger.

In some embodiments, the control module 848 is configured to receive input data by receiving signals from sensors or devices on the machine and process the data to generate a notification (e.g., audible or visual warning). The control module 848 can determine (e.g., using machine logic) based on the input data whether the machine, operator, or bystanders are in a high-risk condition. Examples of high-risk conditions include situations which cause damage to the machine (e.g., machine rolling, machine on fire, colliding with another machine or object, etc.) or situation which cause harm to operators or personnel. The control module 848 can use machine logic to determine if an operator is present and generate an alarm. A first example of machine logic is: if operator presence system (OPS) status=operator present AND seat switch status=operator NOT PRESENT THEN audible warning and/or visual indication. A second example of machine logic is: if OPS status=operator PRESENT AND TOS equals 0 for greater than 30-600 seconds THEN override OPS system status to NOT PRESENT.

In some embodiments, the machine learning module 850 is configured to analyze the input data from the sensors and devices, determine whether the operator is seated, and generate a notification (e.g., audible or visual warning). The machine learning module 852 may be configured to identify when to generate a notification based on at least one machine-learning algorithm trained on at least one dataset of notification commands. The at least one machine-learning algorithms (and models) may be stored locally at databases and/or externally at databases. Machine equipment devices may be equipped to access these machine learning algorithms and intelligently identify when to generate an operator notification based on at least one machine-learning model that is trained on a dataset of operator presence events. As described herein, a machine-learning (ML) model may refer to a predictive or statistical utility or program that may be used to determine a probability distribution over one or more-character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process operator presence detection event databases and other data stores to determine when to generate a notification based on the position of the operator in the cab of a machine. Determining when to generate a notification may comprise identifying whether the operator is seated during operation and alerting the operator before the machine is damaged or personnel (e.g., operator or bystanders) are harmed.

Based on an operator presence data from operator presence databases and platforms and other user data stores, at least one ML model may be trained and subsequently deployed to automatically identify the position of operator and generate a notification. The trained ML model may be deployed to one or more devices. As a specific example, an instance of a trained ML model may be deployed to a server device and to a client device which communicate with a machine. The ML model deployed to a server device may be configured to be used by the client device when, for example, the client device is connected to the Internet.

Conversely, the ML model deployed to a client device may be configured to be used by the client device when, for example, the client device is not connected to the Internet. In some instances, a client device may not be connected to the Internet but still configured to receive satellite signals with item information, such as specific machine information based on the type of machine. In such examples, the ML model may be locally cached by the client device.

Those skilled in the art will appreciate that the components illustrated in FIGS. 6-8 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

INDUSTRIAL APPLICABILITY

The systems and methods described herein can detect the presence of a machine operator. In some implementations, an operator presence system (OPS) monitors a machine to determine whether an operator is present in an operating machine. The OPS collects input data from sensors or devices on the machine. The sensors and devices can include pedal (e.g., brake or throttle) position sensors, machine operating condition sensors, operator-controlled input devices, gear status sensors, throttle position sensors, transmission output speed sensors, or operator cab sensors. The OPS uses a subset of the inputs to the OPS logic to determine, based on the input data, whether the operator is present in the cab of the machine, whether the operator is in the operator seat, or whether there are bystanders in the proximity of the machine. During operation, if an operator is determined to not be in the operator seat, the OPS can generate and send notifications (e.g., visual or audible warnings, such as flashing lights, vibration in the controls or steering instrument, or an alarm) to alert the operator to sit in the operator seat. The notification can continue for a time threshold or until the operator sits in the operator seat. In some implementations, the operator presence system can transmit the notification inside and the outside the cab of the machine to alert bystanders of the potential danger. The present systems and methods can be implemented to manage and control, multiple industrial machines, vehicles and/or other suitable devices such as mining machines, trucks, corporate fleets, etc.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Unless explicitly excluded, the use of the singular to describe a component, structure, or operation does not exclude the use of plural such components, structures, or operations. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, the expression "at least one of A, B, and C" is intended to cover all permutations of A, B and C. For example, that expression covers the presentation of at least one A, the presentation of at least one B, the presentation of at least one C, the presentation of at least one A and at least one B, the presentation of at least one A and at least one C, the presentation of at least one B and at least one C, and the presentation of at least one A and at least one B and at least one C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A computing system comprising:
   at least one processor; and
   at least one memory storing instructions that, when executed by the at least one processor, cause the computing system to perform a process comprising:
   receiving, from at least one device of a machine, sensor data indicating that a pedal of the machine is being engaged by an operator, the machine is in gear, and a seat switch status;
   determining the machine is in gear, the operator is present in the machine, and the operator is engaging the pedal based on the sensor data;
   setting an operator status to indicate that the operator is present in the machine;
   determining, based upon the seat switch status and the operator status indicating that the operator is present in the machine, the operator is not in an operator seat while engaging the pedal of the machine and while the machine is in gear; and
   in response to determining that the operator is not in the operator seat while engaging the pedal of the machine and while the machine is in gear, generating at least one of an audible notification or a visual notification.

2. The computing system of claim 1, wherein the process further comprises:
   determining a transmission output speed of the machine is equal to zero for a time threshold; and
   in response to determining the transmission output speed is equal to zero for the time threshold, setting the operator status to not present.

3. The computing system of claim 1, wherein the process further comprises:
   transmitting the at least one of the audible notification or the visual notification inside and outside an operator cab of the machine.

4. The computing system of claim 1,
   wherein the at least one of the audible notification or the visual notification indicates the operator is not in the operator seat while the machine is at least one of moving and in gear,
   wherein the at least one of the audible notification or the visual notification indicates the operator is not in the operator seat while at least one of a brake pedal, inching pedal, and a throttle pedal is engaged, and
   wherein the at least one of the audible notification or the visual notification indicates a transmission output speed of the machine is equal to zero for a time threshold.

5. The computing system of claim 1,
   wherein the sensor data is received from a plurality of sensors and input devices, and
   wherein the plurality of sensors and input devices includes at least one of pedal position sensors, machine operating condition sensors, operator-controlled input devices, gear status sensors, throttle position sensors, transmission output speed sensors, and operator cab sensors.

6. The computing system of claim 1, wherein the process further comprises:
   setting the operator status to not present until the seat switch status indicates the operator is in the operator seat.

7. The computing system of claim 1, wherein the process further comprises:
   in response to determining that the operator is not in the operator seat, setting the operator status to not present.

8. A method comprising:
   receiving, from at least one device of a machine, sensor data indicating that a pedal of the machine is being engaged by an operator, the machine is in gear, and a seat switch status;
   determining the machine is in gear, the operator is present in the machine, and the operator is engaging the pedal based on the sensor data;
   setting an operator status to indicate that the operator is present in the machine;
   determining, based upon the seat switch status and the operator status indicating that the operator is present in the machine, the operator is not in an operator seat while engaging the pedal of the machine and while the machine is in gear; and
   in response to determining that the operator is not in the operator seat while engaging the pedal of the machine and while the machine is in gear, generating at least one of an audible notification or a visual notification.

9. The method of claim 8, further comprising:
   determining a transmission output speed of the machine is equal to zero for a time threshold; and
   in response to determining the transmission output speed is equal to zero for the time threshold, setting the operator status to not present.

10. The method of claim 8, further comprising:
    transmitting the at least one of the audible notification or the visual notification inside and outside an operator cab of the machine.

11. The method of claim 8,
    wherein the at least one of the audible notification or the visual notification indicates the operator is not in the operator seat while the machine is at least one of moving and in gear,
    wherein the at least one of the audible notification or the visual notification indicates the operator is not in the operator seat while at least one of a brake pedal, inching pedal, and a throttle pedal is engaged, and
    wherein the at least one of the audible notification or the visual notification indicates a transmission output speed of the machine is equal to zero for a time threshold.

12. The method of claim 8,
    wherein the sensor data is received from a plurality of sensors and input devices, and
    wherein the plurality of sensors and input devices includes at least one of pedal position sensors, machine operating condition sensors, operator-controlled input devices, gear status sensors, throttle position sensors, transmission output speed sensors, and operator cab sensors.

13. The method of claim 8, further comprising:
    setting the operator status to not present until the seat switch status indicates the operator is in the operator seat.

14. The method of claim 8, further comprising:
    in response to determining that the operator is not in the operator seat, setting the operator status to not present.

15. A non-transitory computer-readable storage medium comprising: a set of instructions that, when executed by at least one processor, causes the at least one processor to perform operations, including:
receiving, from at least one device of a machine, sensor data indicating that a pedal of the machine is being engaged by an operator, the machine is in gear, and a seat switch status;
determining the machine is in gear, the operator is present in the machine, and the operator is engaging the pedal based on the sensor data;
setting an operator status to indicate that the operator is present in the machine;
determining, based upon the seat switch status and the operator status indicating that the operator is present in the machine, the operator is not in an operator seat while engaging the pedal of the machine and while the machine is in gear; and
in response to determining that the operator is not in the operator seat while engaging the pedal of the machine and while the machine is in gear, generating at least one of an audible notification or a visual notification.

16. The non-transitory computer-readable storage medium of claim 15, wherein the operations further comprise:
determining a transmission output speed of the machine is equal to zero for a time threshold; and
in response to determining the transmission output speed is equal to zero for the time threshold, setting the operator status to not present.

17. The non-transitory computer-readable storage medium of claim 15, wherein the operations further comprise:
transmitting the at least one of the audible notification or the visual notification inside and outside an operator cab of the machine.

18. The non-transitory computer-readable storage medium of claim 15,
wherein the at least one of the audible notification or the visual notification indicates the operator is not in the operator seat while the machine is at least one of moving and in gear,
wherein the at least one of the audible notification or the visual notification indicates the operator is not in the operator seat while at least one of a brake pedal, inching pedal, and a throttle pedal is engaged, and
wherein the at least one of the audible notification or the visual notification indicates a transmission output speed of the machine is equal to zero for a time threshold.

19. The non-transitory computer-readable storage medium of claim 15,
wherein the sensor data is received from a plurality of sensors and input devices, and
wherein the plurality of sensors and input devices includes at least one of pedal position sensors, machine operating condition sensors, operator-controlled input devices, gear status sensors, throttle position sensors, transmission output speed sensors, and operator cab sensors.

20. The non-transitory computer-readable storage medium of claim 15, wherein the operations further comprise:
setting the operator status to not present until the seat switch status indicates the operator is in the operator seat.

* * * * *